United States Patent [19]

Fogerty, Jr.

[11] 4,251,140
[45] Feb. 17, 1981

[54] RIDE ASSEMBLY FOR SIMULATING TRAVEL

[76] Inventor: Robert W. Fogerty, Jr., 2400 Somerset Blvd., Apt. 102, Troy, Mich. 48084

[21] Appl. No.: 17,503

[22] Filed: Mar. 5, 1979

[51] Int. Cl.³ .................................. G03B 29/00
[52] U.S. Cl. ............................ 352/132; 352/69; 352/85
[58] Field of Search .............. 352/131, 132, 69, 85; 272/16, 17, 18

[56] References Cited

U.S. PATENT DOCUMENTS

| | | | |
|---|---|---|---|
| 2,373,313 | 4/1945 | Jeanoron | 352/131 |
| 3,233,508 | 2/1966 | Hemstreet | 352/85 |
| 3,895,861 | 7/1975 | Hernoon | 352/132 |

FOREIGN PATENT DOCUMENTS 1273969  9/1961  France ................................. 272/18

Primary Examiner—Monroe H. Hayes
Attorney, Agent, or Firm—Basile, Weintraub & Hanlon

[57] ABSTRACT

A ride assembly for simulating travel in a preprogrammed environment to passengers is disclosed. The assembly includes a housing having a moveable base adapted for carrying passengers thereon. The assembly also includes a pair of supporting carriage members, the first carriage member being moveably supported at the upper surface of a stationary support cradle member by a first set of bearings which allow the first carriage member to pitch about a fixed pitch axis associated with the cradle member. The first carriage member moveably supports the second carriage member at its upper surface by a second set of bearings which allows the second carriage member to roll about a variable roll axis associated with the first carriage member. The base is fixedly mounted on the second carriage member, and each portion of the base is moved through a range of pitch and roll positions. An audio-visual presentation comprising a sound motion picture film projector in combination with a sound system are disposed on the base and develop a sound motion picture on a spherical inner surface of the housing. The housing is mounted on the base to move therewith. Motors independently drive the first carriage member and the second carriage member under the control of a control circuit in order to move the base in synchronism with the movement of one of the projected moving objects of the motion picture wherein the motion of the base is controlled to simulate a scene moving relative to and exteriorly the housing as viewed by the carried passengers.

2 Claims, 4 Drawing Figures

RIDE ASSEMBLY FOR SIMULATING TRAVEL

TECHNICAL FIELD

This invention relates to ride assemblies and, in particular, to ride assemblies which simulate travel and which carry passengers on a moveable base.

BACKGROUND ART

Some ride assemblies include an audio-visual presentation including a motion picture film projector which projects frames of a motion picture film on a screen disposed at the front of the assembly. The passengers, the film projector, and the screen stay in their relatively fixed positions as the motion picture is being shown after a moveable base on which the passengers are carried has been moved to a predetermined position.

In some instances, especially when the motion picture depicts a fair amount of relative movement between an object in the motion picture and the background and/or foreground of the shown motion picture image, the viewing passengers could more realistically experience the story presented by the motion picture if the viewing passengers themselves experienced the sensation of movement at the same time they were viewing the moving object in the motion picture. It would be especially realistic to the viewing passengers if the movement experienced simulated the motion of the moving object projected on the screen. It would also be desirable to make it an easy matter to change the movement felt by the viewing passengers to simulate the motion of at least one of the moving objects shown in a different projected motion picture or a different moving object in the same motion picture. Such a ride assembly is shown in U.S. patent application Ser. No. 960,533, entitled Motion Picture Theatre Assembly and Method of Using Same, filed Nov. 14, 1978 and having the same inventorship as the present application.

In other instances it would be desirable to construct a ride assembly having a housing which resembles a travel vehicle and which has a moveable base on which passengers are carried and a screen, interior to the housing, on which a scene appears to move relative to an exterior to the housing when the base is moved in a preprogrammed fashion, the screen appearing to act as a window of the vehicle. It would be especially desirable if the motion experienced by the carried passengers could be realistic and at the same time accomplished in a safe, reliable and relatively inexpensive fashion.

DISCLOSURE OF THE INVENTION

An object of the present invention is to provide a ride assembly for simulating travel in a preprogrammed environment wherein passengers are carried on a moveable base and motion pictures are projected on a screen which moves with the base when the base is moved, and wherein moving the objects are formed thereon the screen to simulate a scene moving relative to and exterior to the housing.

Another object of this invention is to provide a ride assembly having a housing with a moveable base on which passengers are carried wherein an audio-visual presentation including a motion picture is projected on a screen which forms a portion of the housing such that the moving objects are formed thereon, and wherein each portion of the moveable base is moved in a controlled fashion to simulate a scene moving relative to and exterior to the housing.

A further object of the invention is to provide a ride assembly having a housing with a moveable base on which passengers are carried wherein a motion picture is projected on a screen which forms a portion of the housing such that moving objects are formed thereon, and wherein the base is moved in a controlled fashion to simulate a scene moving relative to and exterior to the housing by measuring a predetermined characteristic of the projection process and using the measured characteristic to control the motion of each portion of the base.

Yet another object of the present invention is to provide a ride assembly having a housing with a moveable base for carrying passengers thereon and projector means for making an audio-visual presentation including projected motion pictures containing moving objects on a screen which forms a portion of the housing wherein the base is controllably moved to cause each portion of the base to pitch and roll in synchronism with a selected one of the moving objects by an actuating means which, in turn, is controlled by a control means having a replaceable preprogrammed memory means for storing an addressable sequence of control instructions, and wherein the control means utilizes a measured characteristic of the projection process to access the memory means to thereby obtain the control instructions for automatically controlling the actuating means.

In carrying out the above objects and other objects of this invention, a preferred embodiment of the ride assembly for simulating travel in a preprogrammed environment comprises a housing including a moveable base adapted to carry passengers thereon, a support means for supporting the housing, first and second antifriction means disposed between the base and the support means for allowing each portion of the base to pitch and roll with respect to the support means in a relatively resistance-free fashion, and an actuating means operatively associated with the base for imparting motion to the base relative to the support means to cause each portion of the base to pitch and roll. The assembly also includes screen means disposed interior to the housing for exhibiting motion pictures to simulate a window through which a scene exterior to the housing is viewed by the carried passengers; audio-visual presenting means supported by said housing for producing sound within said housing and for showing a series of picture images on the screen means wherein a motion picture having moving objects is formed, the sound and the motion picture providing at least a portion of the environment; and control means for controlling the actuating means to move each portion of the base in synchronism with the movement of a predetermined one of the moving objects wherein the motion of the base is controlled to simulate a scene moving relative to and exterior to the housing.

The objects, features and advantages of the present invention are readily apparent from the following detailed description of the best mode taken in connection with the accompanying drawings.

DESCRIPTION OF THE PREFERRED EMBODIMENT

Figure 1:
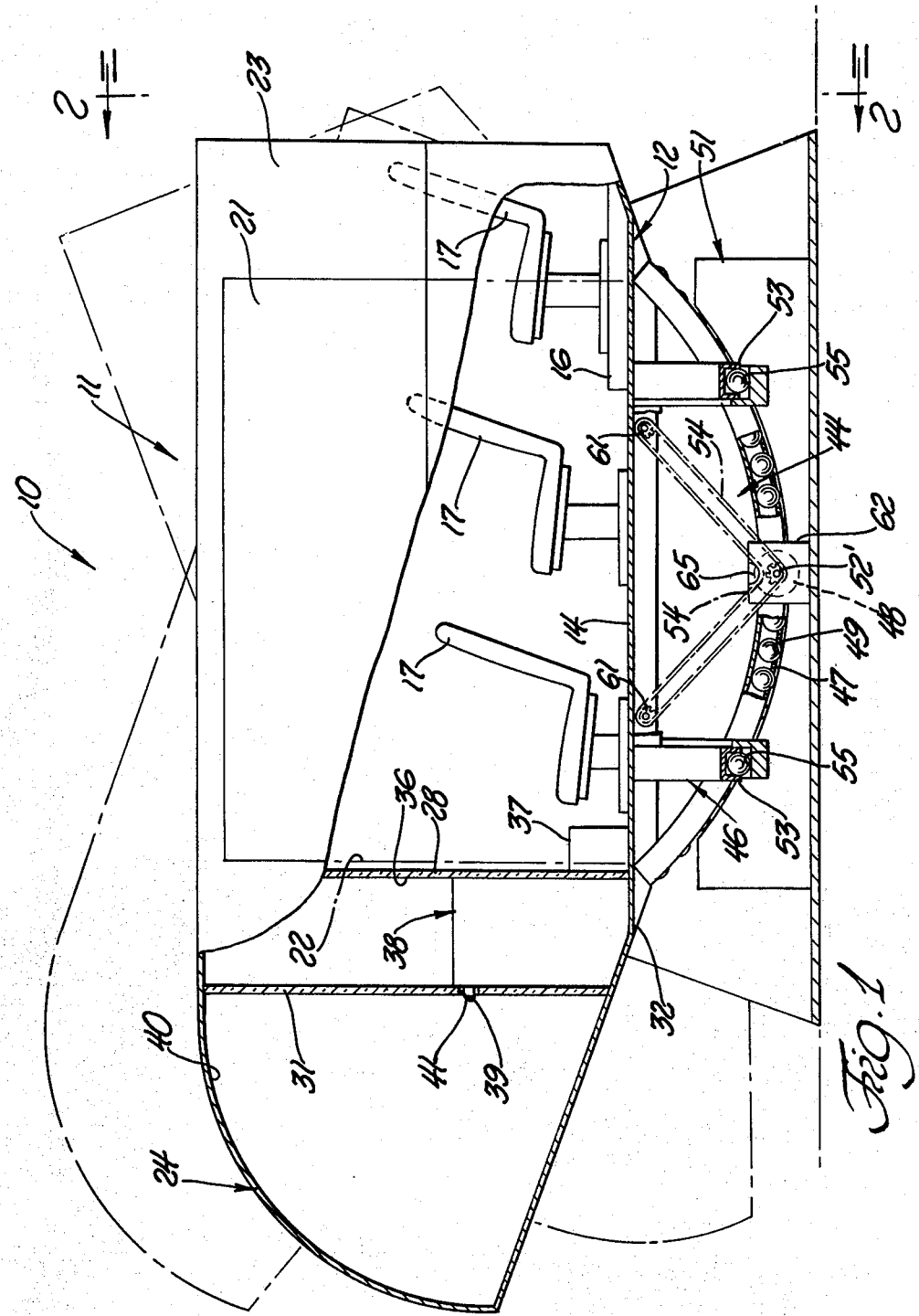
FIG. 1 is a side elevational view, partially broken away and in section, of a ride assembly constructed according to this invention and further showing the ride assembly in two pitch positions in phantom.

Referring now to the drawings, there is shown an illustrative embodiment of the invention in a ride assembly especially adapted for movement and for making an audio-visual presentation to simulate travel in a preprogrammed environment.

Referring to FIG. 1, a ride assembly, which is also referred to as a show ride, constructed according to the present invention is indicated collectively by reference numeral 10. The ride assembly 10 includes a generally rectangular box-shaped housing structure generally indicated at 11 having a generally rectangular integrally formed base generally indicated at 12 adapted to carry passengers thereon a first level 14 and on a slightly elevated second level 16. The floors or levels 14 and 16 have a plurality of spaced rows of chairs or seats 17 fixedly mounted on the top surfaces thereof, such as by bolts.

The audience or passengers enter the ride assembly 10 through a doorway 22 which is formed through a side wall 23 of the housing structure 11 and which can be accessed by sliding upwardly a sliding door 21 which is attached to the side wall in a conventional fashion. The walls of the housing structure 11 are fixedly mounted about the outer periphery of the base 12 to move therewith, such as by bolts.

The housing structure 11 includes a screen means or a spherical screen generally indicated at 24 which comprises a stressed skin structure which, in turn, comprises the front wall of the housing structure 11. The exterior of the housing structure 11 may coincide in its configuration with the type of ride or travel experienced by the passengers. For example, as shown in the FIGS. 1-3 and especially FIG. 3, the exterior of the housing structure 11 is formed in the shape of a spaceship and the passengers, accordingly, will experience an environment including motion, sight and sound, corresponding to the flight of a spaceship through space as will be described in greater detail hereinafter.

The would-be audience or passengers form a queue near or adjacent the doorway 22 at an entrance generally indicated at 25 prior to stepping on and over a step 26 which extends between the front of the queue and the base 12 when the show ride 10 is stopped, and the sliding door 21 is slid upwardly to expose the doorway 22 for passage therethrough.

In the same fashion, a second step 30 is disposed on the opposite side of the housing 11 to allow the passengers to exit from the housing 11 through a doorway (not shown) which is formed through a second side wall 29 of the housing 11. The doorway is also accessed by sliding upwardly a sliding door (not shown) which is similar to the sliding door 21 to enable the passengers to reach an exit generally indicated at 34 when the show ride 10 is stopped.

At the approximate center of the front or forward portion 32 of the base 12 is fixedly mounted, such as by bolts, a generally rectangular-shaped projection compartment 36 which is defined by a pair of transparent panels 28 and 31, which panels 28 and 31 extend from the top surface of the first level 14, above the top surface of the second level 16 to the ceiling of the housing 11.

Figure 4:
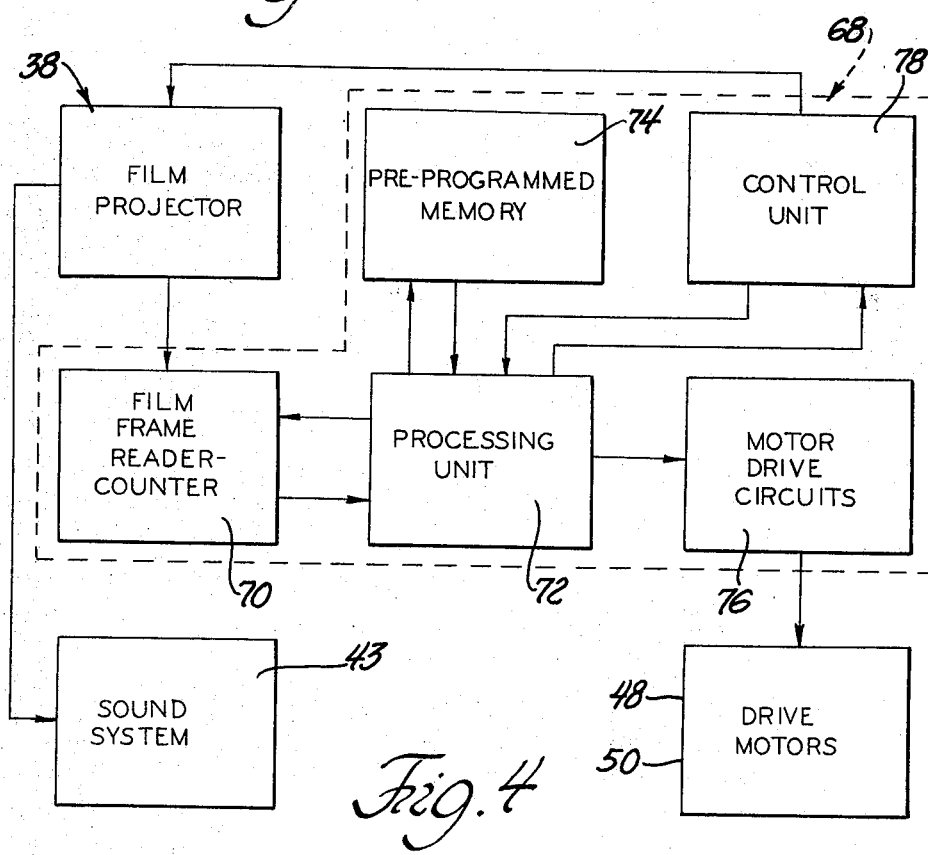
FIG. 4 is a block diagram of apparatus relating to the movement of the ride assembly.

The compartment 36 is adapted to house a sound film projector generally indicated at 38 in FIGS. 1 and 4. The sound film projector 38 projects a series of pictures through a lens 39 of the film projector 38 onto the inside surface 40 the spherical screen 24. The lens 39 extends through an aperture 41 formed through the panel 31.

The sound film projector 38 projects the plurality of pictures from the moving film frames of the motion picture in a conventional fashion over the inside surface 40 of the spherical screen 24 which comprises approximately a quarter-section of a hollow sphere, the carried passengers viewing the motion picture through the transparent panels 28 and 31.

A sound system 43, as shown in FIG. 4, is disposed adjacent the film projector 38, the speakers 37 of the sound system 43 being strategically positioned interior to the housing structure 11. The sound system 43 cooperates with the film projector 38 in a conventional fashion to produce sound from the magnetic or optical pattern contained on the sound track of the sound motion picture film. The sound system 43 and the sound film projector 38 define an audio-visual presenting means or an audio-visual apparatus for making an audio-visual presentation within the housing structure 11.

The base 12 is supported on a pair of stacked carriage members generally indicated at 44 and 46. The base 12 is fixedly mounted on the second carriage member 46 at its top surface, such as by bolts.

The first carriage member 44 is allowed to roll on a pair of upwardly curved semi-circular tracks 49 of a support means or a cradle structure generally indicated at 51 by means of an antifriction means or a set of ball bearings 47 attached to the lower surface of the first carriage member 44. The ball bearings 47 are conventional and comprise races, ball and cages for holding the balls. The ball bearings 47 allow the first carriage member 44 to rotate about a fixed horizontal pitch axis 53' which substantially corresponds to a line drawn between the centers of arcs which coincide with the upper surfaces of the semi-circular tracks 49.

The second carriage member 46 is allowed to roll on a pair of upwardly curved semi-circular tracks 55 of the first carriage member 44 by a second antifriction means or a second set of conventional ball bearings 53 attached to the lower surface of the second carriage member 46. The ball bearings 53 allow the second carriage member 46 to rotate about a roll axis 52 which coincides with the longitudinal axis of the housing structure 11 and which corresponds to a line drawn between the centers of arcs which coincide with the upper surfaces of the semi-circular tracks 55.

The movement of the first carriage member 44 causes the entire base 12 to pitch (i.e. rise or fall with a steep ascent or descent, respectively, in a sudden fashion) about the pitch axis 53' through a maximum angle of approximately 40°, while movement of the second carriage member 46 causes each portion of the base 12 to roll (i.e. swing from side to side) about the roll axis 52 through a maximum angle of approximately 60°. As can be readily appreciated the position of the roll axis 52 varies depending on the relative position of the first carriage member 44 with respect to the cradle structure 51 at the time the rolling motion occurs.

Both the first carriage member 44 and the second carriage member 46 are moved in a controlled fashion by a motor means or a pair of drive motors 48 and 50, respectively, having shafts with sprocket wheels 52' and 56, respectively, mounted thereon to engage with endless linked chains 54 and 59 which also engage spaced sets of sprocket wheels 61 and 63, respectively, which, in turn, are rotatably mounted on the lower surface of the base 12. The motors 48 and 50, which may be electric or hydraulic, are supported by mounting brackets 62 and 64, respectively. The mounting brackets 62 and 64 also rotatably support rollers 65 and 66, respectively, which cooperate with their associated sprocket wheels 52', 61 and 56, 63, respectively to rotate the housing structure 11 about is axis 52 and 53', in a controlled fashion. Rotational movement of either or both of the motor shafts with their corresponding sprocket wheels 52' and/or 56 causes the base 12 to be pulled downwardly at the sprocket wheels 61 and/or 63 under tension.

Figure 2:
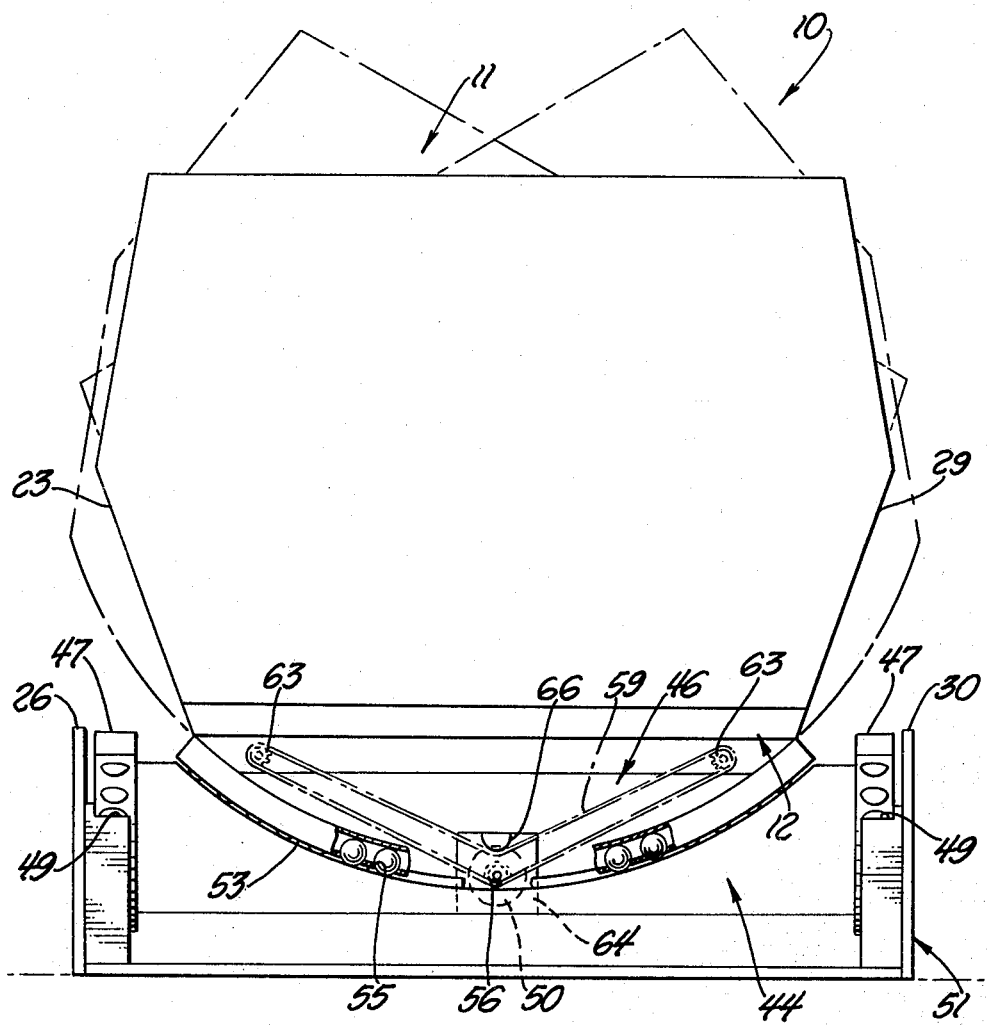
FIG. 2 is an end view, partially broken away, of the ride assembly taken along line 2—2 of FIG. 1 and further showing the ride assembly in two roll positions in phantom.
Figure 3:
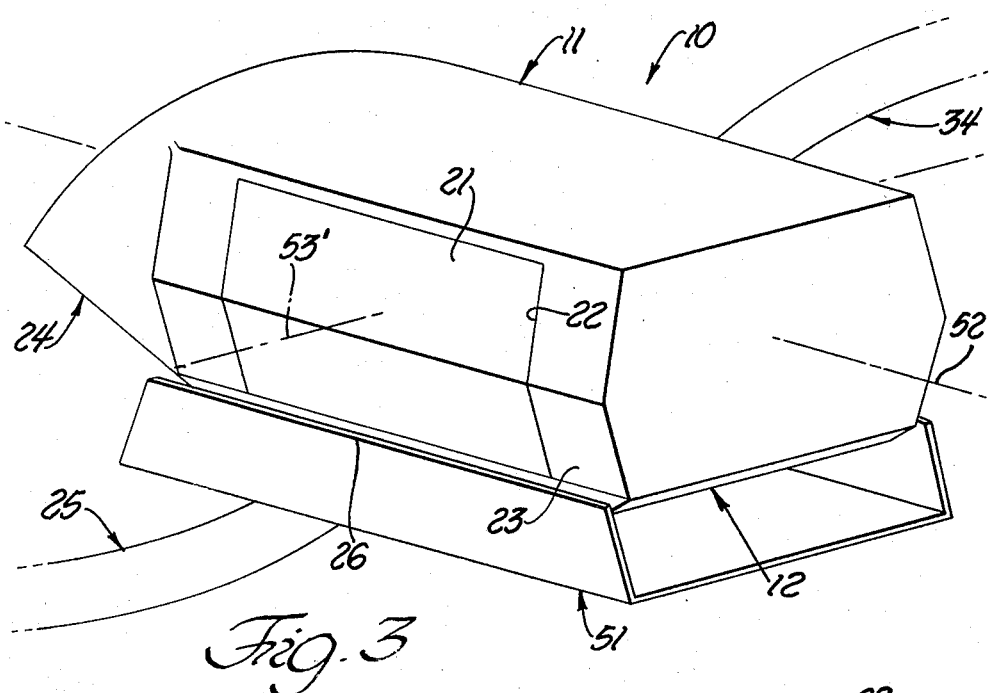
FIG. 3 is a perspective view of the ride assembly in a rest or stopped position.

The ride assembly 10 also includes control means or a control circuit generally indicated at 68 in FIG. 4. The control circuit 68 controls the motors 48 and 50 to either stop, start, speed-up or slow down the rotational movement of their associated motor shafts with their corresponding sprocket wheels 52' and 56, respectively to thereby control the pitch of the base 12 through the first carriage member 44 and/or the roll of the base 12 through the second carriage member 46. In this way, the base 12 is made to pitch and roll as shown in FIGS. 1 and 2.

The motion of the base 12 is synchronized by the control circuit 68 with the motion of a predetermined moving object shown or projected on the inner surface 40 of the spherical screen 24, such as a rolling sea, in order to simulate, or cause the audience to experience the motion shown. In other words, the motion of the base 12 occurs substantially simultaneously with the motion of the predetermined moving object projected to have substantially the same phase and period and to give the appearance that the scene shown appears to move relative to and exteriorly the housing structure 11.

The control circuit 68 also includes a measuring means or a conventional film frame reader-counter 70 which counts the number of frames projected during the projection process. A conventional electronic processing unit 72 of the control circuit 68 utilizes the number counted by the reader-counter 70 to address a replaceable preprogrammed memory means or memory 74 of the control circuit 68 which may comprise a solid state, plug-in, integrated circuit read-only-memory (ROM). The memory 74 has stored therewithin an addressable sequence of predetermined control instructions which are accessed by the processing unit 72 and sent in sequence to conventional motor drive circuits 76 of the control circuit 68 to control the drive motors 48 and 50. In other words, the control circuit 68 sends control signals to drive the motors 48 and 50 based on the current prevailing count of film frames projected by the film projector 38. The control instructions are determined after it has been determined by viewing the particular motion picture how the relative movement between a particular scene and the housing structure 11 is to be simulated.

A manually operated control unit 78 of the control circuit 68 is provided to signal the processing unit 72 and the film projector 38 to automatically initiate or stop the projection of film and the movement of the base 12 through the drive motors 48 and 50. The processing unit 72 provides a signal to the control unit 78 when the film projector 38 runs out of film.

Depending on what film is to be projected by the projector 38, a corresponding memory such as the memory 74 is plugged into the control circuit 68. Each such memory has stored therein the control instructions necessary to control the motors 48, which instructions are accessed by the processing unit 72, using the count obtained by the reader-counter 70 to address those corresponding instructions. In this way the control circuit 68 controls the motors 48 and 50 which, in turn, move the base 12 through the first carriage member 44 and the second carriage member 46, respectively, in synchronism with the movement of the predetermined moving object of the moving objects projected by the film projector 38. In this way the motion of the base 12 is controlled to simulate a scene which appears to move relative to and exterior to the housing structure 11 and which, in fact, appears on the inner surface 40 of the spherical screen 24. In this way the screen 24 having a scene projected thereon acts as a transparent window to the ambient outside the housing structure 11.

While a preferred embodiment of the ride assembly has been shown and described herein in detail, those skilled in this art will recognize various alternative designs and embodiments for practicing the present invention as defined by the following claims.

What is claimed is:

1. A ride assembly for simulating travel in a preprogrammed environment, said assembly comprising:
   (a) a housing including a moveable base adapted to carry passengers thereon;
   (b) support means for supporting said housing;
   (c) first and second antifriction means disposed between said base and said support means for allowing each portion of said base to pitch and roll with respect to said support means in a relatively resistance-free fashion, wherein said first antifriction means comprises roller bearings disposed between said support means and said first carriage means, and wherein said second antifriction means comprises roller bearings disposed between said first and second means;
   (d) actuating means operatively associated with said base for imparting motion to said base relative to said support means to cause each portion of said base to pitch and roll wherein said actuating means includes:
     1. a moveable carriage means moveably supported on said support means by said first antifriction means for, in turn, supporting said base, said carriage means moving about a fixed pitch axis associated with said support means through a predetermined range of pitch positions under the control of control means, said pitch axis being substantially perpendicular to the longitudinal axis of carriage means throughout said predetermined range of pitch positions;
     2. a second carriage means moveably supported on said first carriage means by said second antifriction means for, in turn, supporting said base, said second carriage means allowing each portion of said base to move with respect to said first carriage means and said support means, said second carriage means being fixedly connected to said base, said second carriage means moving about a variable roll axis associated with said first carriage member through a predetermined range of roll positions under the control of said control means said roll axis being substantially parallel to said longitudinal axis of said first carriage means throughout said predetermined range of roll positions;

(e) screen means disposed interior to said housing for exhibiting motion pictures to simulate a window through which a scene exterior to said housing is viewed by the carried passengers, wherein:
1. said screen means comprises a spherical screen carried by said base to move therewith; and
2. said screen means receives projected motion pictures and defines a portion of said housing disposed above said base;

(f) audio-visual presenting means supported by said housing for producing sound within said housing and showing a series of picture images on said screen means wherein a motion picture having moving objects is formed, said sound and said motion picture providing at least a portion of the environment, wherein:
1. said audio-visual presenting means includes a projector means spaced from said screen means for projecting the series of picture images on said screen means;
2. said projector means is supported by said housing, the housing disposed above said base being connected with said base to move therewith; and
3. said projector means comprises a sound motion picture film projector carried by said base to move therewith for projecting a plurality of pictures from the film frames of sound motion picture film in series, said audio-visual presenting means including sound reproducing means producing sound synchronously with the projection of motion pictures on said screen means; and (g) control means for controlling said actuating means to move each portion of said base in synchronism with the movement of a predetermined one of said moving objects wherein the motion of said base is controlled to simulate a screen moving relative to and exterior to said housing wherein:
1. said control means includes measuring means for measuring a predetermined characteristic of said projection process to automatically control said actuating means;
2. said measuring means counts the number of frames projected during said projection process, said control means utilizing said number to access said memory means, said memory means being replaceable with a second memory means to control the motion of each portion of said base to simulate a second scene moving relative to an exterior to said housing; and
3. said control means includes a preprogrammed memory means for storing an addressable sequence of control instructions, said control means utilizing said measured characteristic to access the memory means to thereby obtain said control instructions for automatically controlling said actuating means.

2. The ride assembly of claim 1 wherein said actuating means includes motion means connected to said base; and said first and second carriage means allow said base to move under the control of said control means relative to said support means about said pitch and roll axis.

* * * * *